United States Patent [19]
Marrelli

[11] Patent Number: 5,234,012
[45] Date of Patent: Aug. 10, 1993

[54] PETROLEUM STREAM CONTROL SYSTEM AND METHOD

[75] Inventor: John D. Marrelli, Houston, Tex.

[73] Assignee: Texaco Inc., White Plains, N.Y.

[21] Appl. No.: 814,534

[22] Filed: Dec. 30, 1991

Related U.S. Application Data

[63] Continuation-in-part of Ser. No. 584,680, Sep. 19, 1990, abandoned.

[51] Int. Cl.⁵ .............................................. G05D 11/13
[52] U.S. Cl. ....................................... 137/2; 137/172; 137/118; 73/61.43; 324/640
[58] Field of Search ............... 137/172, 118, 119, 2; 73/61.1 R; 324/640

[56] References Cited

U.S. PATENT DOCUMENTS

| | | | |
|---|---|---|---|
| 3,2253,711 | 5/1966 | Young | 137/172 |
| 3,966,603 | 6/1976 | Grant | 137/172 X |
| 4,647,371 | 3/1987 | Schmitt | 137/172 X |
| 4,947,127 | 8/1990 | Helms | 324/640 |
| 4,947,128 | 8/1990 | Hatton | 324/640 |
| 4,947,129 | 8/1990 | Helms | 324/640 |

Primary Examiner—John Rivell
Attorney, Agent, or Firm—James J. O'Loughlin; Ronald G. Gillespie

[57] ABSTRACT

A petroleum stream control system includes a valve receiving a petroleum stream which divides the petroleum stream into at least two petroleum substreams in accordance with the control signal. A sample stream is withdrawn from each substream and irradiated with microwave energy. Microwave energies that have passed through the sample streams are received. A signal circuit generated signals corresponding to an electrical property of the sample stream in accordance with the received microwave energies. A control circuit provides the control signal to the valve in accordance with the signals from the signal circuit, so as to control the dividing of the petroleum stream.

8 Claims, 1 Drawing Sheet

PETROLEUM STREAM CONTROL SYSTEM AND METHOD

This application is a continuation-in-part of application Ser. No. 07/584,680 filed Sep. 19, 1990, now abandoned.

BACKGROUND OF THE INVENTION

Field of the Invention

The present invention relates to control systems and methods in general and, more particularly, to a petroleum stream control system and method.

SUMMARY OF THE INVENTION

A petroleum stream control system includes a valve receiving a petroleum stream which divides the petroleum stream into at least two petroleum substreams in accordance with the control signal. A sample stream is withdrawn from each substream and irradiated with microwave energy. Microwave energies that have passed through the sample streams are received. A signal circuit generated signals corresponding to an electrical property of the sample stream in accordance with the received microwave energies. A control circuit provides the control signal to the valve in accordance with the signals from the signal circuit, so as to control the dividing of the petroleum stream.

The objects and advantages of the invention will appear more fully hereinafter from a consideration of the detailed description which follows, taken together with the accompanying drawings wherein one embodiment of the invention is illustrated by way of example. It is to be expressly understood, however, that the drawings are for illustration purposes only and are not to be construed as defining the limits of the invention.

DESCRIPTION OF THE INVENTION

Figure 1:
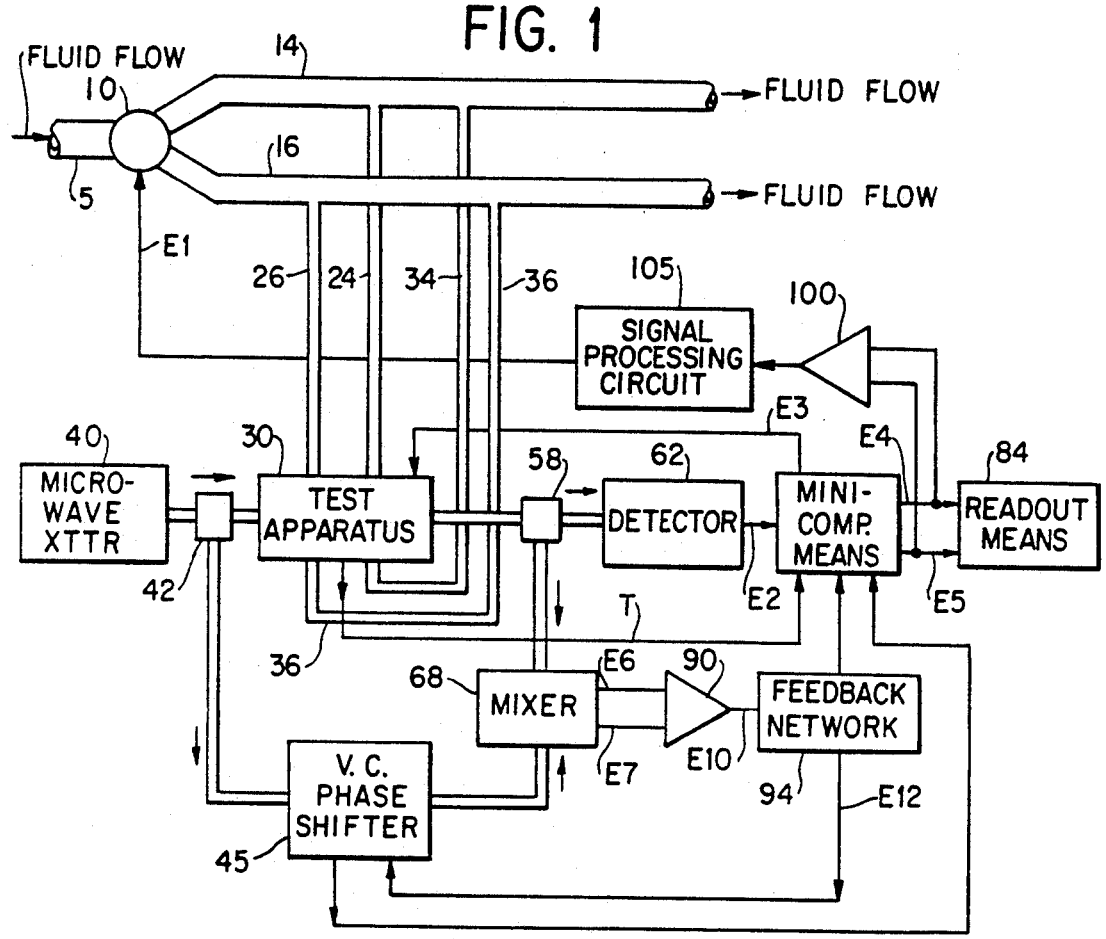
FIG. 1 is a partial simplified block diagram and a partial schematic of a petroleum stream control system constructed in accordance with the present invention.

Referring to FIG. 1, there is shown a pipeline 5, carrying a flowing petroleum stream, being connected to valve means 10 which is controlled by an electronic signal E1 as hereinafter explained. Valve means 10 may be of the type described and disclosed in U.S. Pat. No. 5,165,450. Valve means 10 is connected to two other pipelines 14 and 16, and controls the flow of the fluid in pipeline 5 to pipelines 14 and 16 in accordance with signal E1. In essence, valve 10 divides the petroleum stream flowing in pipeline 5 into petroleum substreams flowing in pipelines 14 and 16.

Pipelines 14 and 16 have sampling lines 24 and 26, respectively, which draw off sample streams of the substreams in pipelines 14 and 16, respectively and provide them to test apparatus 30.

Test apparatus 30 will be described in more detail hereinafter. Sufficient to say at this time that the sample streams in sampling lines 24 and 26 pass through test apparatus 30 and enter sampling lines 34 and 36, respectively, which are in turn connected to pipelines 14 and 16, respectively. Thus, the sample stream in pipeline 14 flows through sampling line 24 through test apparatus 30 and returns to pipeline 14 by way of sampling line 34. Similarly, sample stream from pipeline 16 flows through sampling line 26 through test apparatus 30 and returns to pipeline 16 by way of sampling line 36.

While the sample streams are flowing through test apparatus 30, they are subjected to microwave analysis. In this regard a microwave transmitter 40 provides electromagnetic energy, hereinafter referred to as microwave energy, at a microwave frequency. Transmitter 40 is low powered and may use a microwave gun source. Transmitter 40 provides the microwave energy to a directional coupler 42. Directional coupler 42 provides the microwave energy to a conventional type voltage control phase shifter 45 and to test apparatus 30. All conductance or carrying of microwave energy is accomplished by using conventional type wave guides and coaxial cables.

The microwave energy, after passing through a sample stream exits test apparatus 30 and is hereinafter referred to as test microwave energy. The test microwave energy is applied to a directional coupler 58. Directional coupler 58 provides the test microwave energy to a detector 62 and to a mixer 68.

Detector 62 provides a signal E2, corresponding to the test microwave energy, to minicomputer means 80. It should be noted at this time, as will be explained hereinafter, that there is microwave switching within test apparatus 30 that in effect causes signal E2 to be a time divided multiplex signal, that is, at one point in time signal E2 represents the test microwave energy associated with the sample stream in lines 26 and 36 and that at another time, signal E2 corresponds to the test microwave energy associated with sample fluid flowing in lines 24 and 34. Obviously these times are alternating constantly during testing. Signal E2 is provided to minicomputer means 80 which provides signal E3 to control test apparatus 30.

There is a temperature sensing device within test apparatus 30 which provides a temperature signal T, corresponding to the sensed temperature of the sample streams, to computer means 80. Computer means 80 provides two signals E4 and E5 corresponding to the water cuts of the sample stream flowing in line 24 and to sample stream flowing in line 26, respectively. Signals E4 and E5 are provided to readout means 84.

Voltage control phase shifter 45 provides microwave energy, hereinafter called the reference microwave energy, to mixer 68, which mixes the reference microwave energy and the test microwave energy to provide two electrical signals E6 and E7, representative of the phases of the reference microwave energy and the test microwave energy, respectively.

A differential amplifier 90 provides an output signal E10 in accordance with the difference between signals E2, E3, to feedback network 94. Signal E10 is a function of the phase difference between the reference microwave energy and the test microwave energy. Feedback network 94 provides a signal E12 to voltage control phase shifter 45, controlling the phase of the reference microwave energy, and to minicomputer means 80. Signal E12, decrease in amplitude until there is substantially 90° phase difference between the reference microwave energy and the test microwave energy. Voltage control phase shifter 45 indicates the amount of phase shift required to eliminate the phase difference.

Phase shifter 45 also provides a signal E14 to computer means 80 to utilize signals T, E12 and E2 to select the proper water cut value for the particular sample stream.

Signals E4 and E5 are also provided a difference amplifier 100 whose output signal is provided to a signal processing circuit 105. Signal processing circuit 105 may be of the type described and disclosed in U.S. application Ser. No. 07/812,456, filed Dec. 23, 1991. Signal processing circuit 105 processes the output signal from differential amplifier 100 to provide control signal E1 to valve means 10.

Figure 2:
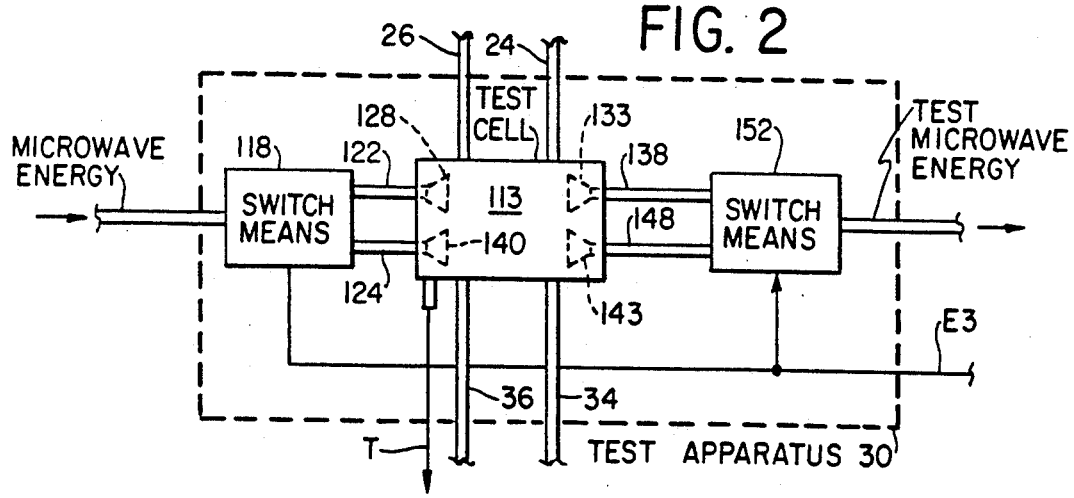
FIG. 2 is a simplified block diagram of the test apparatus shown in FIG. 1.

With reference to FIGS. 1 and 2, test apparatus 30 includes a test cell 113. Test cell 113 is of the type described and disclosed in U.S. application Ser. No. 07/314,337, filed Feb. 23, 1989 now U.S. Pat. No. 4,947,127. Microwave energy from directional coupler 42 enters switch means 118 which provides microwave energy to test cell 113 through either a line 122 or line 124. Line 122 provides the microwave energy to an antenna 128 which radiates the microwave energy into one sample stream flowing through lines 26, 36. The microwave energy passing through that sample stream is received by an antenna 133 which provides the received microwave energy to waveguide 138.

Similarly, the microwave energy in line 124 is provided to an antenna 140 which transmits the microwave energy into the sample stream flowing through lines 24 and 34. The microwave energy that has passed through that sample fluid is received by antenna 143 and provided to a waveguide 148. Waveguides 138 and 148 are connected to switch means 152 which is controlled by signal E3. The output of switch means 152 is the test microwave energy and is provided to directional coupler 58. Signal E3 controls switch means 118 and 152 so that during one time frame the microwave energy is being transmitted through the sample stream in lines 26 and 36 and during a second time frame the microwave energy is being transmitted through the sample stream in lines 24, 34.

What is claimed is:

1. A petroleum stream control system comprising:
   valve means receiving a petroleum stream for dividing the petroleum stream into at least two petroleum substreams in accordance with a control signal,
   means for withdrawing a sample stream from each substream,
   irradiating means for irradiating each sample stream with microwave energy,
   receiving means for receiving the microwave energies that have passed through the sample streams and providing the received microwave energies as test microwave energies,
   signal means connected to the irradiating means and to the receiving means for providing signals corresponding to an electrical property of the sample streams, and
   control means connected to the signal means and to the valve means for providing the control signal to the valve means in accordance with the signals from the signal means so as to control the dividing of the petroleum stream.

2. A system as described in claim 1 in which the control means includes:
   difference amplifier means connected to the signal means for providing a difference signal corresponding to the difference between signals representing the electrical property of the sample streams, and
   means connected to the valve means and to the difference amplifier means for processing the difference signal to provide the control signal to the valve means.

3. A system as described in claim 2 in which the irradiating means includes:
   source means for providing microwave energy,
   a first plurality of antenna means for irradiating microwave energy, and
   first switching means connecting the source means to the plurality of antenna means for providing microwave energy from the source means to each antenna means at different times so that each antenna means irradiates a corresponding sample stream with microwave energy.

4. A system as described in claim 3 in which the detecting means includes:
   a second plurality of antenna means, each antenna means being means for receiving microwave energy,
   second switching means, connected to the second plurality of antenna means and cooperating with the first switching means, for passing microwave energy from the second plurality of antenna means as test microwave energy to the signal means.

5. A petroleum stream control method comprising the steps of:
   receiving a petroleum stream with valve means for dividing the petroleum stream into at least two petroleum substreams in accordance with a control signal,
   withdrawing a sample stream from each substream,
   irradiating each sample stream with microwave energy,
   receiving the microwave energies that have passed through the sample streams,
   providing the received microwave energies as test microwave energies,
   providing signals with signal means corresponding to an electrical property of the sample streams in accordance with the test microwave energies, and
   providing the control signal to the valve means in accordance with the signals from the signal means so as to control the dividing of the petroleum stream.

6. A method as described in claim 5 in which the control step includes:
   providing a difference signal corresponding to the difference between signals representing the electrical property of the sample streams, and
   processing the difference signal to provide the control signal to the valve means.

7. A method as described in claim 6 in which the irradiating step includes:
   providing microwave energy,
   irradiating microwave energy with a first plurality of antenna means, and
   providing microwave energy from the source means to each antenna means at different times so that each antenna means irradiates a corresponding sample stream with microwave energy.

8. A method as described in claim 7 in which the detecting step includes:
   receiving microwave energy with a second plurality of antenna means,
   second switching means, passing microwave energy from each antenna means of the second plurality of antenna means at different times as test microwave energy to the signal means.

* * * * *